Figure 3:
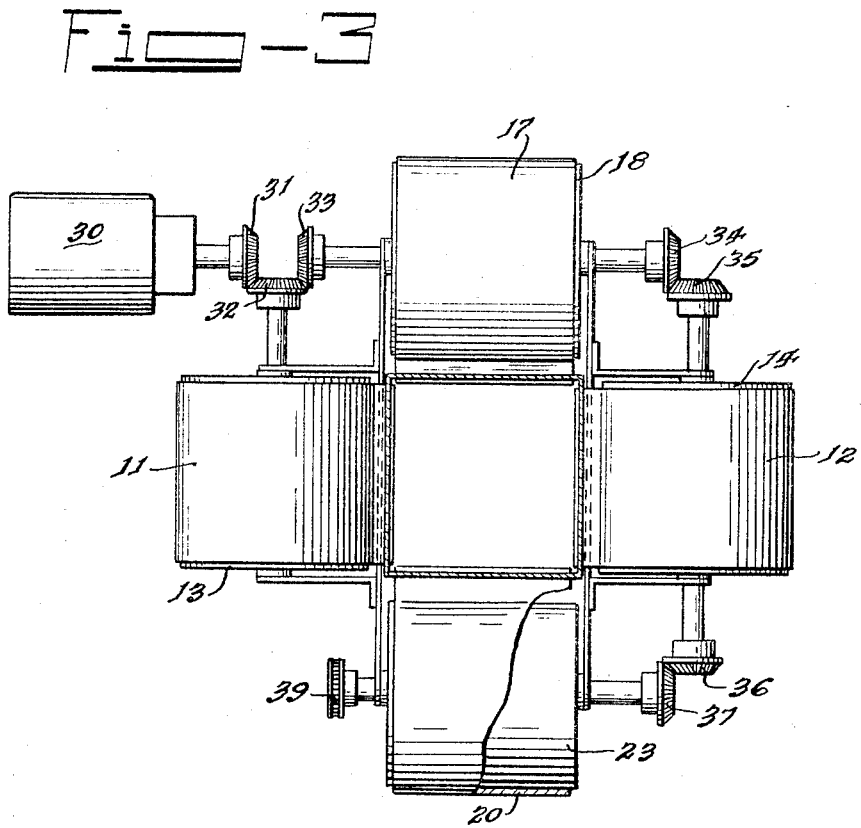

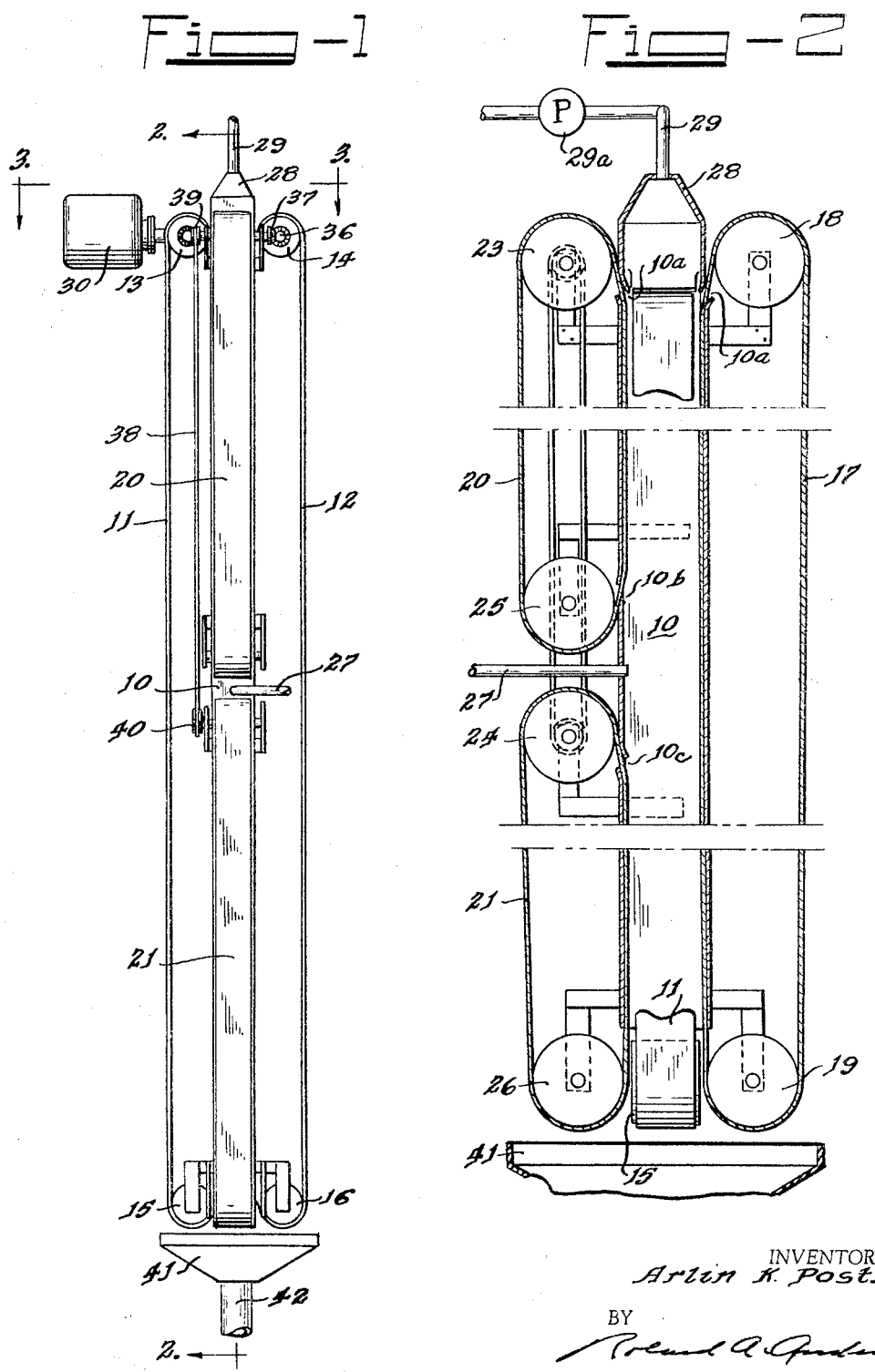

Aug. 30, 1966  A. K. POSTMA  3,269,536
MOVING WALL ELUTRIATOR
Filed June 11, 1963  2 Sheets-Sheet 2

INVENTOR.
Arlin K. Postma
BY
Roland A. Anderson
Attorney 3,269,536
MOVING WALL ELUTRIATOR
Arlin K. Postma, Corvallis, Oreg., assignor to the United States of America as represented by the United States Atomic Energy Commission
Filed June 11, 1963, Ser. No. 287,162
1 Claim. (Cl. 209—138)

The invention described herein was made in the course of, or under, a contract with the U.S. Atomic Energy Commission.

The invention relates to an improved elutriator for separating particles according to weight or size, and for other such purposes for which devices of this kind are used.

Elutriators are a well known type of apparatus in the chemical process and related industries. (E.g., Chemical Engineers' Handbook, Third Edition, McGraw-Hill Book Company, Inc., New York, 1950, pages 1084, 1085 and 1112.) They are used to separate particles having different rates of settling within a current of fluid, which may be due to different specific gravities when particles of different species are mixed together, but more commonly the difference is due merely to variations in particle sizes of the same material, which are the natural result of any comminution process such as grinding. Since the size of particles of the same kind, and hence their air resistance, increases in direct proportion to their radius, whereas their volume and hence their weight increases in proportion to the square of their radius, a difference in settling rates results which makes fractionation possible in this situation.

Though widely used to separate particles according to size, elutriators leave something to be desired. Separations are rarely complete, and the process must be repeated several times, or as is usually said, in stages. This tends to be wasteful economically, and adds to the dust hazard. The latter drawback is especially serious in the atomic energy industry where many processes involve the handling of finely divided radioactive particles; under such circumstances the desirability of eliminating, or at least reducing the number of stages of elutriation, is apparent.

It is, accordingly, the general object of the invention to provide an improved elutriator which will make more complete separations of particles than can be made by elutriators now known.

It is a more particular object to provide an elutriator which will separate radioactive particles in fewer stages than can be done by elutriators now known.

Other objects will appear as the description proceeds.

Reasoning that a major factor detracting from the efficiency of elutriators is turbulence and a nonuniform velocity caused by fluid friction adjacent the walls of the separation chamber, or column, carrying the fluid stream in which the particles are separated, I have conceived of an elutriator having walls that move at about the same velocity as the stream, thereby eliminating the fluid friction. The fluid stream will thereby have an essentially constant velocity across the entire cross section of the chamber and particles introduced near the center will be more truly fractionated according to their settling velocity without interference in the region of the walls.

Figure 4:
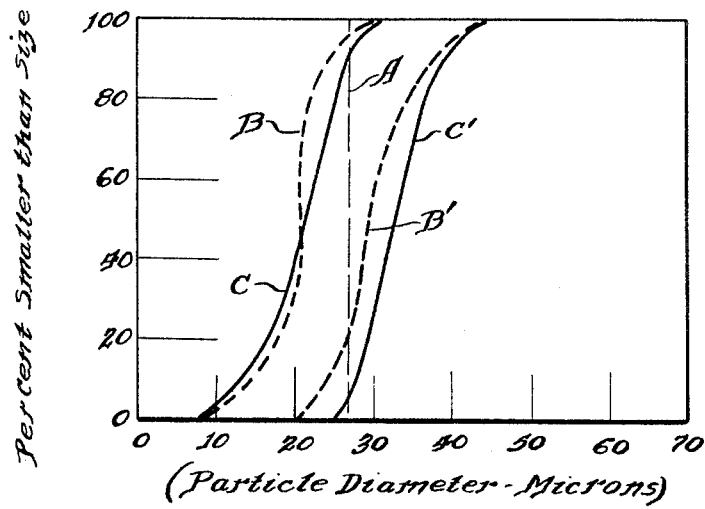

Reference is now made to drawings,
FIG. 1 of which is a front view of the improved elutriator of the invention.
FIG. 2 is a sectional side view of the elutriator, along the line 2—2 of FIG. 1.
FIG. 3 is a sectional top view of the elutriator, along the line 3—3 of FIG. 1.
FIG. 4 is a graph in which percentages smaller than size and larger than size of a cut of fine glass spheres made by the elutriator of the invention, as ordinates, is plotted against particle diameter in microns as abscissae.

As can most clearly be seen from FIG. 2, the main body of the elutriator consists of vertical tube 10, in this embodiment of square cross section and made of sheet metal. A small area of the outer surface of the tube 10 is also visible near the center of FIG. 1.

The top of the walls of tube 10 are bent slightly outward to form lips 10a, and across its front wall is a pair of horizontal slots 10b and 10c, located slightly above and below the mid-level.

As can be seen from FIGS. 1, 2 and 3, a pair of belts 11 and 12 run around the sides of the tube 10, being held in place by flat pulleys 13, 14, 15 and 16. The belts 11 and 12 are long enough to run inside the tube 10 along its entire length and wide enough to cover the inner side walls of the tube 10 substantially completely but slightly narrower so as to be able to run without binding at the edges. It will be noted that the centers of the pulleys 13, 14, 15 and 16 are offset outwardly from the walls of tube 10 so that one side of each belt, which is the taut side, runs in contact with, or at least very close to the inside walls of the tube 10, and the slack side is outwardly from tube 10 by slightly more than the diameter of the pulleys.

Likewise, as is shown in FIG. 2, a third belt 17, of the same length as belts 11 and 12 is held in a similar relationship to the back wall of tube 10 by upper pulley 18 and lower pulley 19. It covers the back wall substantially completely with its taut side, and its slack side, as in the case of belts 11 and 12 is away from the outside of the tube by slightly more than the diameter of the pulleys.

In the front of the elutriator a pair of belts 20 and 21 run in the same way around upper and lower portions respectively of the front of tube 10, passing through the slots 10b and 10c and held in place by upper pulleys 23 and 24, and lower pulleys 25 and 26. These pulleys are likewise offset from the walls of tube 10 so as to cause the taut sides of belts 20 and 21 to run closely against the front wall of tube 10, with the exception of a small intervening space between them which is due to the fact that the total over-all lengths of belts 20 and 21 do not quite equal the length of the other belts, 11, 12 and 17. Belts 20 and 21 substantially cover the width of the front wall of tube 10, as in the case of the other belts just mentioned, and their slack sides are offset in the same way.

In the preferred embodiment here shown belts 20 and 21 are of equal length, and the space between them is at the mid-level of tube 10. Within this space is material introducing means 27, in this preferred embodiment a line entering tube 10 and an air propulsion means (not shown). In some applications means 27 could be placed upwardly or downwardly from the mid-level and the lengths of belts 20 and 21 adjusted accordingly, but ordinarily introduction of the material to be separated is best carried out at the mid-level of the elutriator as shown here.

Cap 28, approximately in the shape of a square-cornered funnel and approximately of the same cross-sectional dimensions as tube 10 fits against belts 11, 12, 17 and 20 as they veer away from the inside walls of tube 10 over the lips 10a in the direction of their respective driving pulleys 13, 14, 18 and 23. Thus, there is formed a single separation chamber of uniform cross section which can be considered to have as its walls the taut sides of belts 11, 12, 17, 20 and 21, the small uncovered section of the front wall of tube 10 between belts 20 and 21, and cap 28. Inasmuch as by far the greater portion of the walls of this separation chamber is capable of moving upward in a manner which will be explained, I have named my device the moving wall elutriator, in distinction to conventional elutriators with stationary walls.

Leading out from cap 28 is vacuum and up-product line 29 which goes to an up-product separation means (not shown) such as a cyclone separator, and a vacuum source such as a pump 29a. The term up-product is defined as those particles which by reason of their weight and size are carried upwardly from introduction means 27 through the upper region of the separation chamber, in distinction to the down-product, which is those particles which are not so carried, but settle downwardly against the air stream in the separation chamber.

The numeral 30 designates a variable speed motor which, as can be seen in FIG. 3, imparts motion to driving pulleys 13, 18, 14 and 23 in that order through a system of bevel gears 31, 32, 33, 34, 35, 36 and 37. The driving pulleys impart equal upward motion on the inside of tube 10 to belts 11, 12, 17 and 20. Motion in the same direction is imparted to driving pulley 24 from driving pulley 23 by means of drive chain 38 running in sprockets 39 and 40, and thus belt 21 moves in the same way as the other belts.

Down-product receiver 41, in the approximate shape of a flattened square-cornered funnel, sits below the bottom of separation chamber and down-product recovery line 42 leads to a product separation means (not shown).

To operate my elutriator the vacuum means causes a stream of air to enter through the open space between the receiver 41 and the separation chamber and to rise up through the length of the separation chamber. At the same time electric motor 30 is turned on and run at a rate so that all the belts 11, 12, 17, 20 and 21 run upward inside the tube 10 at approximately the same velocity as that of the air stream. The finely divided material to be fractionated is then introduced through introduction means 27. The portion of the material whose settling rate is greater than the velocities of the stream and belt will settle downwardly into the down-product receiver 41; the portion of the material whose rate of settling is less than the velocities mentioned will rise into vacuum and up-product line 29. A velocity gradient along the walls of the separation chamber is avoided by the equality of the velocities of the moving walls and the stream, and the particles of the material will thus be divided more truly in accordance with Stokes' law than when conventional elutriators with stationary walls are used.

EXAMPLE I

A moving wall elutriator of the type shown in FIGS. 1, 2 and 3 was constructed with the following dimensions:

Over-all height _____ 5'11".
Inside dimensions of tube 10 _____ 3" x 3" x 5'5".
Diameter of all pulleys _____ 3".
Width of all belts _____ 2 15/16".

The belts were made of paper coated with polyethylene plastic and the pulleys were of wood.

In order to test the operation of the elutriator a number of batches of glass spheres of different particle diameters were put through the elutriator. The air flow was varied, and the terminal velocities of the spheres of diameters determined, as set forth in Table I below:

*Table I*

[Particle density=2 g./cc.]

| Particle Diameter ($\mu$) | $V_t$ (ft./sec.) | Air Flow (ft.³/min.) |
|---|---|---|
| 1 | 0.00024 | 0.00090 |
| 5 | 0.0019 | 0.00712 |
| 10 | 0.021 | 0.0788 |
| 15 | 0.045 | 0.169 |
| 20 | 0.08 | 0.300 |

EXAMPLE II

A mixture of glass spheres having particle diameters ranging from 8 to 44 microns was put through the elutriator described in Example I using an air velocity chosen to separate the mixture into two size fractions, or cuts, (1) 27 microns and smaller, and (2) greater than 27 microns. The test was performed first with the walls of the elutriator stationary, and then with the walls moving upward at approximately the same velocity as the air stream. The separation was significantly better on the second test, as is shown by the smaller overlap of about 6 microns in the graph of FIG. 4.

In FIGURE 4, the curves show the cumulative size analyses for the "up-product" and "down-product" when the separator was adjusted to give a nominal "cut size" of 27 microns, indicated by the line A. The abscissae refer to the diameters of the glass spheres or particles. The ordinates of the respective curves give the percent by number of particles in each product having diameters of less than indicated by the corresponding abscissae. The curve C gives the analysis of the "up-product" using the moving wall, B, the analysis of the "up-product" with the walls stationary, $C^1$, the analysis of the "down-product" with the walls moving, and $B^1$, the analysis of the "down-product" with the walls stationary.

It will be understood that this invention is not to be limited to the details given herein, but that it may be modified within the scope of the appended claim.

What is claimed is:

A moving wall elutriator having a vertical square-cornered tube having upper and lower horizontal slots across its front wall adjacent its mid-level, belt pulleys at both ends of the side walls, back wall and front wall of the tube, said pulleys being offset a slight distance outwardly from the tube, upper and lower belt pulleys adjacent the slots across the front of the tube and offset a slight distance outwardly from the tube, three belts with their taut sides running uward in contact with the entire length of the inside of the back wall and the inside of the side walls of the tube and over the pulleys at the ends of respective walls, the slack sides of said belts being outside the tube, a belt with its taut side running upward in contact with the inside of the upper portion of the inside of the front wall of the tube through the upper horizontal slot across the front of the tube, over the pulley at the upper end of front wall of the tube and the upper pulley adjacent said horizontal slots, a belt with its taut side running upward in contact with the inside of the lower portion of the inside of the front wall of said tube through the lower horizontal slot, over the pulley at the lower end of the front wall and the lower pulley adjacent said horizontal slots, all said belts substantially covering the width of the walls with which they run in contact, means for introducing finely divided material into the tube between said horizontal slots in said front wall, a capping means over the tube, means for producing an upward current of fluid within the tube, and means for driving the taut sides of said belts inside of the walls upwardly at a velocity approximately equal to the velocity of said current of fluid.

References Cited by the Examiner

UNITED STATES PATENTS 1,575,165  3/1926  Hopkinson _____ 209—129 X
1,701,624  2/1929  Lide _____ 209—467

FRANK W. LUTTER, *Primary Examiner.*